United States Patent
Eilers et al.

(10) Patent No.: US 11,644,124 B1
(45) Date of Patent: May 9, 2023

(54) ATTENUATOR DOME FOR A BALL VALVE

(71) Applicant: FISHER CONTROLS INTERNATIONAL LLC, Marshalltown, IA (US)

(72) Inventors: Daniel J. Eilers, Marshalltown, IA (US); Allen C. Fagerlund, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/228,226

(22) Filed: Apr. 12, 2021

(51) Int. Cl.
*F16K 47/14* (2006.01)
*F16K 5/06* (2006.01)

(52) U.S. Cl.
CPC ............... *F16K 47/14* (2013.01); *F16K 5/06* (2013.01)

(58) Field of Classification Search
CPC ............ F16K 47/14; F16K 5/06; F16K 47/08
USPC ............ 251/127, 315.01–315.16; 138/40–46
See application file for complete search history.

(56) References Cited

U.S. PATENT DOCUMENTS

| | | | | |
|---|---|---|---|---|
| 4,109,680 A * | 8/1978 | Lavender | ............. | B01D 63/082 137/599.11 |
| 4,295,493 A * | 10/1981 | Bey | ....................... | F16K 5/0605 138/43 |
| 4,398,563 A * | 8/1983 | Kay | .......................... | F16K 3/34 137/625.3 |
| 4,530,375 A * | 7/1985 | Bey | .......................... | F16K 5/10 137/625.32 |
| 4,567,915 A * | 2/1986 | Bates | ....................... | F16K 47/08 137/625.3 |
| 5,180,139 A * | 1/1993 | Gethmann | ............. | F16K 5/0605 137/625.32 |
| 5,332,004 A * | 7/1994 | Gethmann | ............. | F16K 5/0605 137/625.32 |
| 5,890,505 A * | 4/1999 | Boger | ....................... | F16K 5/06 137/1 |
| 5,937,901 A * | 8/1999 | Bey | ....................... | F16K 47/045 137/625.32 |
| 5,988,586 A * | 11/1999 | Boger | ..................... | F16K 47/08 138/42 |
| 6,807,986 B2 * | 10/2004 | Boger | ..................... | F16K 47/08 138/44 |
| 6,974,116 B1 * | 12/2005 | Christenson | .......... | F16K 5/0605 137/625.32 |

(Continued)

*Primary Examiner* — John Bastianelli
(74) *Attorney, Agent, or Firm* — Marshall, Gerstein & Borun LLP (57) ABSTRACT

An attenuator dome for a ball valve includes a body defining an upstream surface and a downstream surface. The body has first and second attenuation sections. The first attenuation section has a single stage with a first plurality of passages extending from the upstream surface to the downstream surface. The second attenuation section has a first stage with a second plurality of passages extending from the upstream surface to a first plenum formed inside the body and a second stage with a third plurality of passages extending from the first plenum to the downstream surface. The single stage of the first attenuation section has first flow area percentage, the first stage of the second attenuation section has a second flow area percentage less than the first flow area percentage, and the second stage has a third flow area percentage greater than the second flow area percentage.

21 Claims, 5 Drawing Sheets

(56) References Cited

U.S. PATENT DOCUMENTS

| | | | | |
|---|---|---|---|---|
| 7,156,122 | B2* | 1/2007 | Christenson | F16K 5/0605 137/625.32 |
| 9,404,591 | B2* | 8/2016 | Yli-Koski | F16B 21/18 |
| 9,599,269 | B2* | 3/2017 | Malik | F16L 55/00 |
| 10,100,947 | B2* | 10/2018 | Gattavari | F16K 47/045 |
| 2010/0258193 | A1* | 10/2010 | Christenson | F16K 5/0605 137/1 |
| 2018/0245713 | A1* | 8/2018 | Eilers | F16K 5/0657 |
| 2021/0207740 | A1* | 7/2021 | Watson | F16K 47/045 |

* cited by examiner

ATTENUATOR DOME FOR A BALL VALVE

FIELD OF THE DISCLOSURE

This disclosure relates generally to ball valves and, more particularly, to attenuator domes for ball valves for characterized noise attenuation.

BACKGROUND

In typical control valves, aerodynamic noise can be created as a fluid passes through the control valve. In addition, cavitation and resultant noise and vibration from cavitation are created when a liquid flowing through the control valve undergoes a high pressure drop. Cavitation occurs when fluid vaporizes and then returns to a liquid state, such as when a fluid passes through a restriction, such as a between a flow control member and valve seat. The fluid can reach its vapor point due to decrease in pressure and increase in velocity at the restriction. Cavitation causes noise and vibration, which can damage the control valve. This phenomenon is especially likely in ball and butterfly valves where the pressure drop occurs in only one stage.

In some cases it may be desirable to condition fluid as it flows through the control valve, for example, to reduce cavitation and/or aerodynamic noise. In these cases, a trim assembly may be used that includes a plurality of openings that are drilled, cast, punched, machined, etc., through the trim assembly. The openings may be sized and shaped to condition fluid flow as the fluid flows through the openings, for example, by decreasing pressure as the fluid moves through the trim assembly without generating unwanted noise or cavitation. The amount of noise and/or cavitation reduction desired may be different due to different fluid flows with the flow control member in different positions, especially for ball valves.

Therefore, there is a need for a characterized valve trim assembly or attenuator dome for ball valves that provides different conditioned fluid flow depending on the travel of the flow control member of the ball valve.

BRIEF SUMMARY OF THE DISCLOSURE

In accordance with one exemplary aspect of the present invention, an attenuator dome for a ball valve comprises a body defining an upstream surface, a downstream surface opposite the upstream surface, and a circumferential surface extending between the upstream surface and the downstream surface. The body comprises a first attenuation section and a second attenuation section. The first attenuation section has a single stage with a first plurality of passages extending through the body from the upstream surface to the downstream surface. The second attenuation section has a first stage with a second plurality of passages extending from the upstream surface to a first plenum formed inside the body and a second stage with a third plurality of passages extending from the first plenum to the downstream surface. The single stage of the first attenuation section has a first flow area percentage, the first stage of the second attenuation section has a second flow area percentage that is less than the first flow area percentage, and the second stage of the second attenuation section has a third flow area percentage that is greater than the second flow area percentage.

In further accordance with any one or more of the foregoing exemplary aspects of the present invention, the attenuator dome for a ball valve may further include, in any combination, any one or more of the following preferred forms.

In one preferred form, the third flow area percentage is equal to the first flow area percentage.

In another preferred form, each of the first plurality of passages has a first cross-sectional area, each of the second plurality of passages has a second cross-sectional area smaller than the first cross-sectional area, and each of the third plurality of passages has a third cross-sectional area greater than the second cross-sectional area.

In another preferred form, the body is a unitary, integrally formed, single-piece structure.

In another preferred form, the first plurality of passages are arcuate from the upstream surface to the downstream surface.

In another preferred form, the second stage of the second attenuation section is arcuate.

In another preferred form, the second plurality of passages are arcuate from the upstream surface to the first plenum and the third plurality of passages are arcuate from the first plenum to the downstream surface.

In another preferred form, the upstream surface is arcuate and has a radius of curvature equal to a radius of curvature of an outside surface of a flow control member of the ball valve.

In another preferred form, the body comprises a third attenuation section having a first stage with a fourth plurality of passages extending from the upstream surface to a second plenum formed inside the body, a second stage with a fifth plurality of passages extending from the second plenum to a third plenum formed inside the body, and a third stage with a sixth plurality of passages extending from the third plenum to the downstream surface. The first stage of the third attenuation section has a fourth flow area percentage that is less than the second flow area percentage, the second stage of the third attenuation section has a fifth flow area percentage that is greater than the fourth flow area percentage, and the third stage of the third attenuation section has a sixth flow area percentage that is greater than the fifth flow area percentage.

In another preferred form, the fifth flow area percentage is equal to the second flow area percentage and the sixth flow area percentage is equal to the first flow area percentage.

In another preferred form, each of the fourth plurality of passages has a fourth cross-sectional area smaller than the second cross-sectional area, each of the fifth plurality of passages has a fifth cross-sectional area greater than the fourth cross-sectional area, and each of the sixth plurality of passages has a sixth cross-sectional area greater than the fifth cross-sectional area.

In another preferred form, the fourth plurality of passages are arcuate from the upstream surface to the second plenum, the fifth plurality of passages are arcuate from the second plenum to the first plenum, and the sixth plurality of passages are arcuate from the first plenum to the downstream surface.

In another preferred form, the second stage of the third attenuation section is arcuate, and the third stage of the third attenuation section is arcuate In another preferred form, a ball valve has a valve body having an inlet and an outlet. A flow control member having an outside surface having a radius of curvature is positioned within the valve body and rotatable between an open position, in which fluid flow is allowed between the inlet and the outlet, and a closed position, in which fluid flow is not allowed between the inlet and the outlet. A shaft extends through the valve body an is connected to the flow control member to rotate the flow control member between the open position and the closed position. An attenuator dome is positioned within the valve body downstream of the flow control member. The attenuator dome comprises a body defining an upstream surface, a downstream surface opposite the upstream surface, and a circumferential surface extending between the upstream surface and the downstream surface. The body comprises a first attenuation section and a second attenuation section. The first attenuation section has a single stage with a first plurality of passages extending through the body from the upstream surface to the downstream surface. The second attenuation section has a first stage with a second plurality of passages extending from the upstream surface to a first plenum formed inside the body and a second stage with a third plurality of passages extending from the first plenum to the downstream surface. The single stage of the first attenuation section has a first flow area percentage, the first stage of the second attenuation section has a second flow area percentage that is less than the first flow area percentage, and the second stage of the second attenuation section has a third flow area percentage that is greater than the second flow area percentage.

In accordance with another exemplary aspect of the present invention, an attenuator dome for a ball valve comprises a body defining an upstream surface, a downstream surface opposite the upstream surface, and a circumferential surface extending between the upstream surface and the downstream surface. The body comprises a first attenuation section and one or more additional attenuation sections. The first attenuation section having a single stage with a plurality of passages extending through the body from the upstream surface to the downstream surface. Each of the additional attenuation sections having at least a first stage consisting of a plurality of passages in fluid communication with a plenum formed within the body, wherein each consecutive additional attenuation section has a greater number of stages than an adjacent additional attenuation section.

In further accordance with any one or more of the foregoing exemplary aspects of the present invention, the attenuator dome for a ball valve may further include, in any combination, any one or more of the following preferred forms.

In one preferred form, the first attenuation section has a first flow area percentage, the first stage of a second attenuation section of the additional attenuation sections has a second flow area percentage that is less than the first flow area percentage, and a second stage of the second attenuation section of the additional attenuation sections has a third flow area percentage that is greater than the second flow area percentage.

In another preferred form, the third flow area percentage is equal to the first flow area percentage.

In another preferred form, the plurality of passages of the first attenuation section each have a first cross-sectional area and the plurality of passages of the first stages of the additional attenuation sections each have second cross-sectional areas that are smaller than the first cross-sectional area.

In another preferred form, each of the additional attenuation sections has a first stage wherein the plurality of passages of each first stage have a cross-sectional area smaller than the cross-sectional area of the passages of the first stage of an adjacent additional attenuation section.

In another preferred form, the body is a unitary, integrally formed, single-piece structure.

In another preferred form, the plurality of passages of the first attenuation section are arcuate from the upstream surface to the downstream surface.

In another preferred form, the upstream surface is arcuate and has a radius of curvature equal to a radius of curvature of an outside surface of a flow control member of the ball valve.

In accordance with another exemplary aspect of the present invention, a ball valve comprises a valve body having in inlet and an outlet. A flow control member has an outside surface having a radius of curvature, is positioned within the valve body, and is rotatable between a closed position, in which fluid flow is not allowed between the inlet and the outlet, and an open position, in which fluid flow is allowed between the inlet and the outlet. A shaft extends through the valve body and is connected to the flow control member to rotate the flow control member between the closed position and the open position. An attenuator dome is positioned within the valve body downstream of the flow control member and comprises a first section and a second section. The first section provides a first conditioned fluid flow through the first section with the flow control member positioned between the closed position and a first position, between the closed position and the open position. The second section provides a second conditioned fluid flow through the second section, different than the first conditioned fluid flow, with the flow control member positioned between the first position and a second position, between the first position and the open position.

In further accordance with any one or more of the foregoing exemplary aspects of the present invention, the ball valve may further include, in any combination, any one or more of the following preferred forms.

In one preferred form, the attenuator dome comprises an arcuate upstream surface having a radius of curvature equal to the radius of curvature of the flow control member.

In another preferred form, the second section has a single stage with a first plurality of passages extending through the attenuator dome from an upstream surface to a downstream surface and the first section has a first stage with a second plurality of passages extending from the upstream surface to a first plenum formed inside the attenuator dome and a second stage with a third plurality of passages extending from the first plenum to the downstream surface. The single stage of the second section has a first flow area percentage, the first stage of the first section has a second flow area percentage that is less than the first flow area percentage, and the second stage of the first section has a third flow area percentage that is greater than the second flow area percentage.

In another preferred form, the third flow area percentage is equal to the first flow area percentage.

In another preferred form, each of the first plurality of passages has a first cross-sectional area, each of the second plurality of passages has a second cross-sectional area smaller than the first cross-sectional area, and each of the third plurality of passages has a third cross-sectional area equal to the first cross-sectional area.

In another preferred form, the attenuator dome comprises a third section that provides a third conditioned fluid flow through the third section, different than the first conditioned fluid flow and the second conditioned fluid flow, with the flow control member positioned between the second position and the open position.

In another preferred form, the third section has a single stage with a first plurality of passages extending through the attenuator dome from an upstream surface to a downstream surface, the single stage of the third section having a first flow area percentage. The second section has a first stage with a second plurality of passages extending from the upstream surface to a first plenum formed inside the attenuator dome and a second stage with a third plurality of passages extending from the first plenum to the downstream surface, the first stage of the second section having a second flow area percentage that is less than the first flow area percentage and the second stage of the second section having a third flow area percentage that is greater than the second flow area percentage. The first section has a first stage with a fourth plurality of passages extending from the upstream surface to a second plenum formed inside the body, a second stage with a fifth plurality of passages extending from the second plenum to a third plenum formed inside the body, and a third stage with a sixth plurality of passages extending from the third plenum to the downstream surface, the first stage of the first section having a fourth flow area percentage that is less than the second flow area percentage, the second stage of the first section having a fifth flow area percentage that is greater than the fourth flow area percentage, and the third stage of the first section having a sixth flow area percentage that is greater than the fifth flow area percentage.

In another preferred form, the third flow area percentage is equal to the first flow area percentage, the fifth flow area percentage is equal to the second flow area percentage, and the sixth flow area percentage is equal to the first flow area percentage.

In another preferred form, each of the first plurality of passages has a first cross-sectional area, each of the second plurality of passages has a second cross-sectional area smaller than the first cross-sectional area, each of the third plurality of passages has a third cross-sectional area greater than the second cross-sectional area, each of the fourth plurality of passages has a fourth cross-sectional area smaller than the second cross-sectional area, each of the fifth plurality of passages has a fifth cross-sectional area greater than the fourth cross-sectional area, and each of the sixth plurality of passages has a sixth cross-sectional area greater than the fifth cross-sectional area.

DETAILED DESCRIPTION

The example characterized ball valve attenuator domes shown and described herein provide staged noise attenuation that is conditioned in different sections and uses pressure staging and jet disruption in the downstream section of a ball valve. The attenuator domes are configured to provide more disruption and noise attenuation of the jet exiting the valve at low travels of the flow control member of the ball valve by going through one or more pressure reducing stages, since high pressure drops are typically seen at low travels so more pressure staging is necessary for noise attenuation, and less disruption and fewer stages at larger travels of the flow control member.

Figure 1:
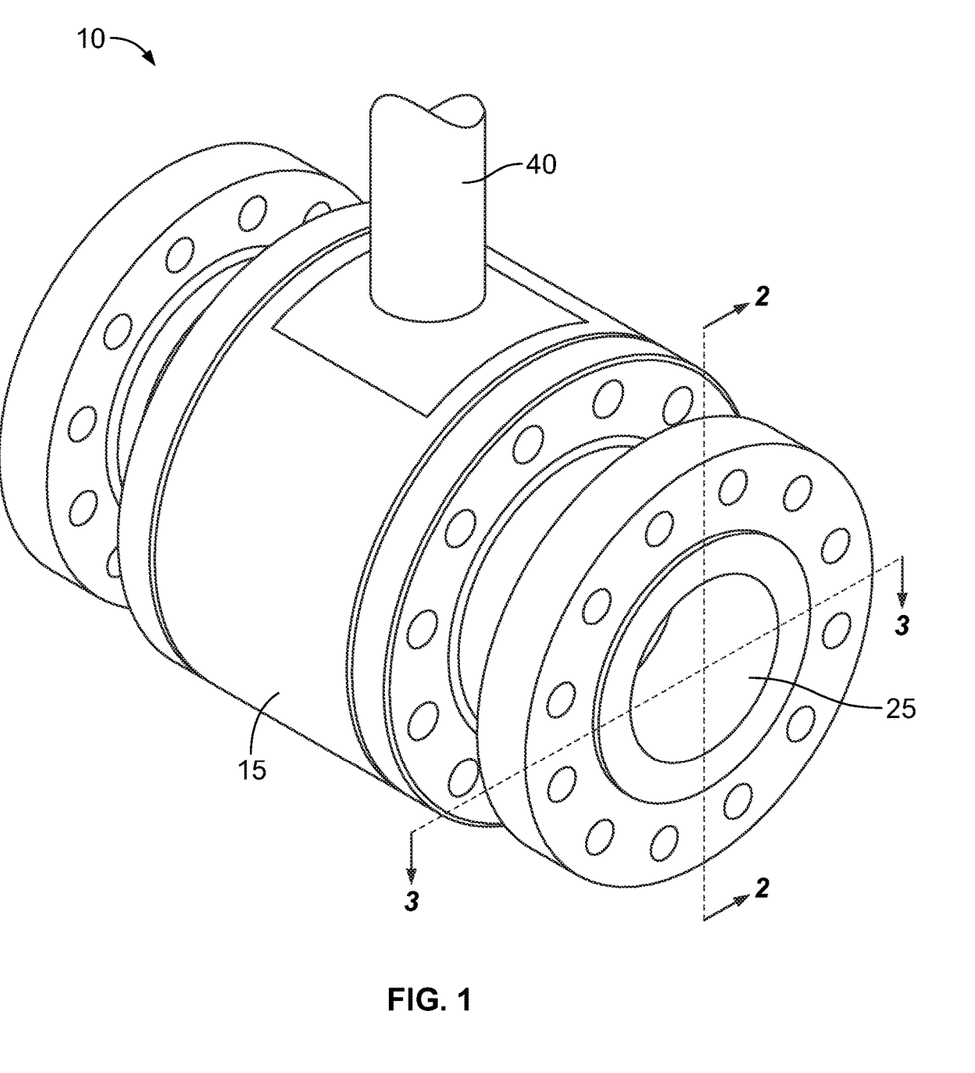
FIG. 1 is a perspective view of an example ball valve.
Figure 2:
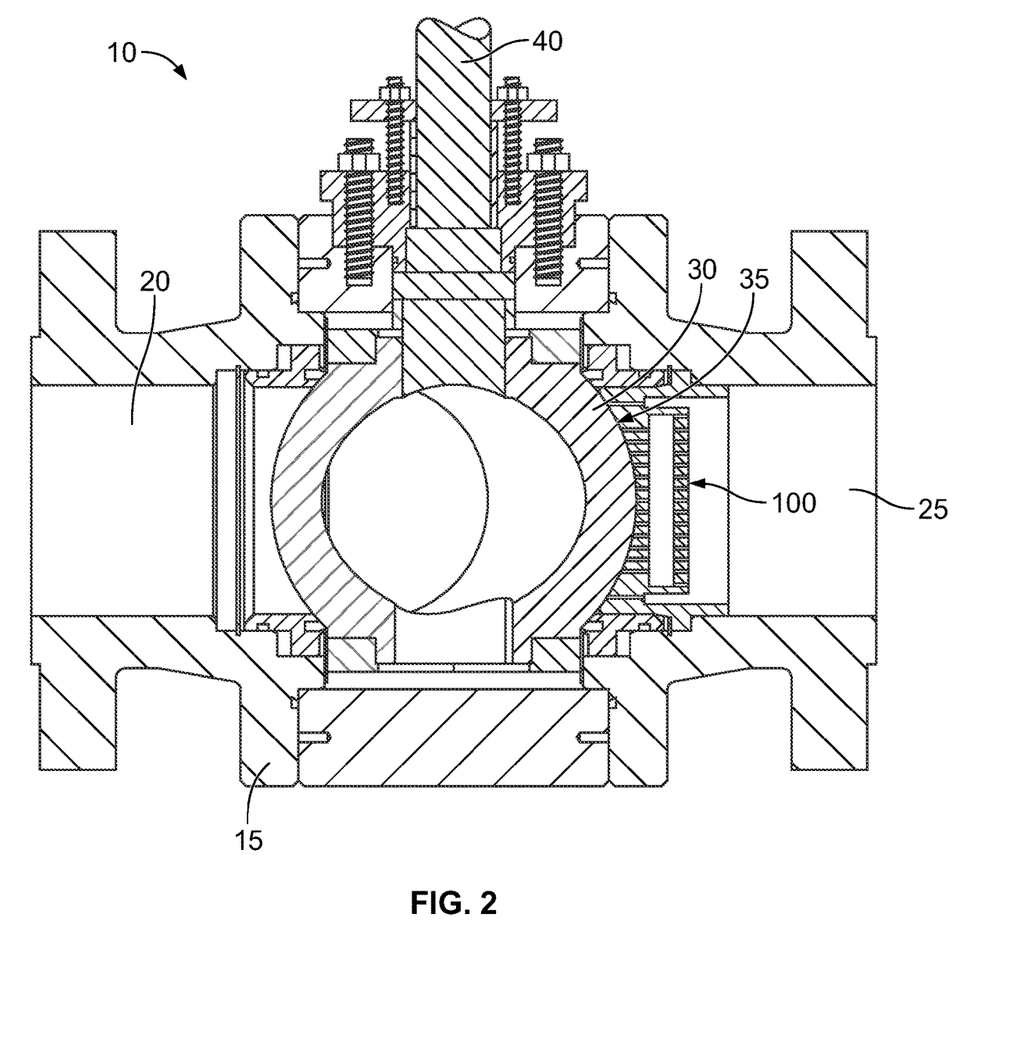
FIG. 2 is a side cross-sectional view of the ball valve of FIG. 1 taken along line 2-2 in FIG. 1.
Figure 3:
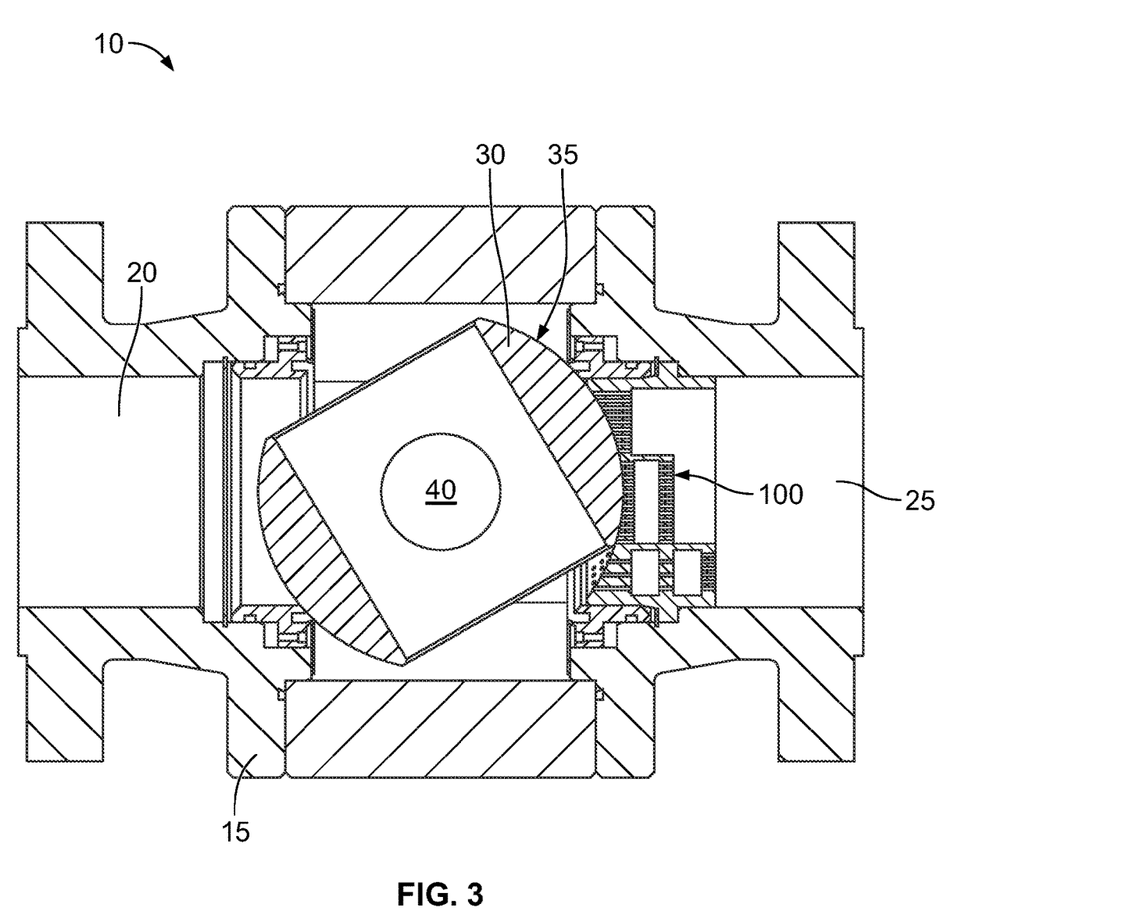
FIG. 3 is a top cross-sectional view of the ball valve of FIG. 1 taken along line 3-3 in FIG. 1.
Figure 4A:
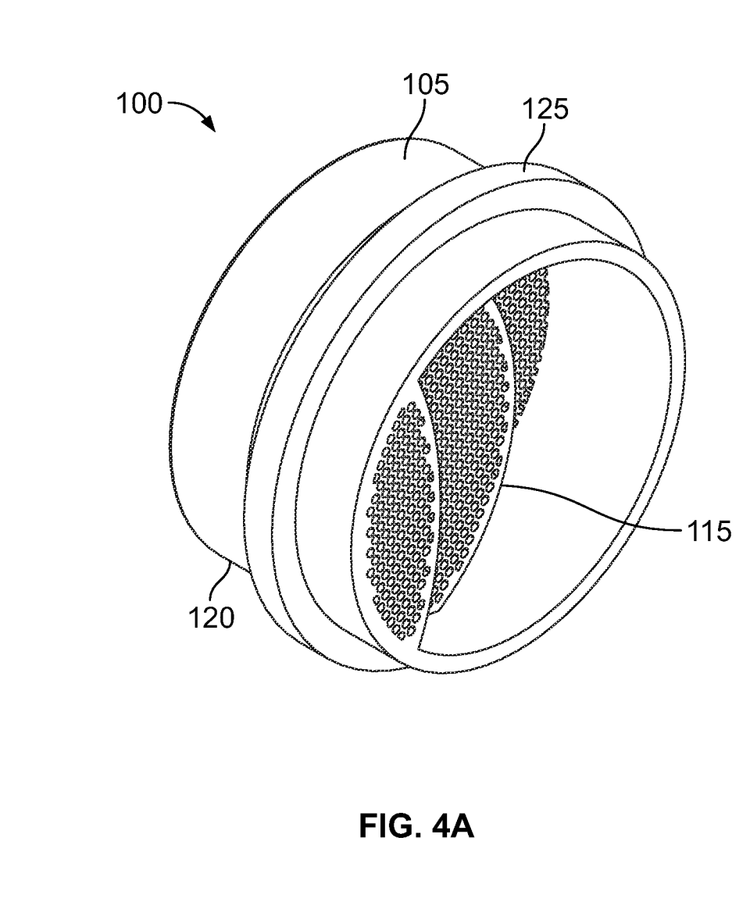
FIGS. 4A and 4B are perspective views of an example attenuator dome of the ball valve of FIG. 1.
Figure 4B:
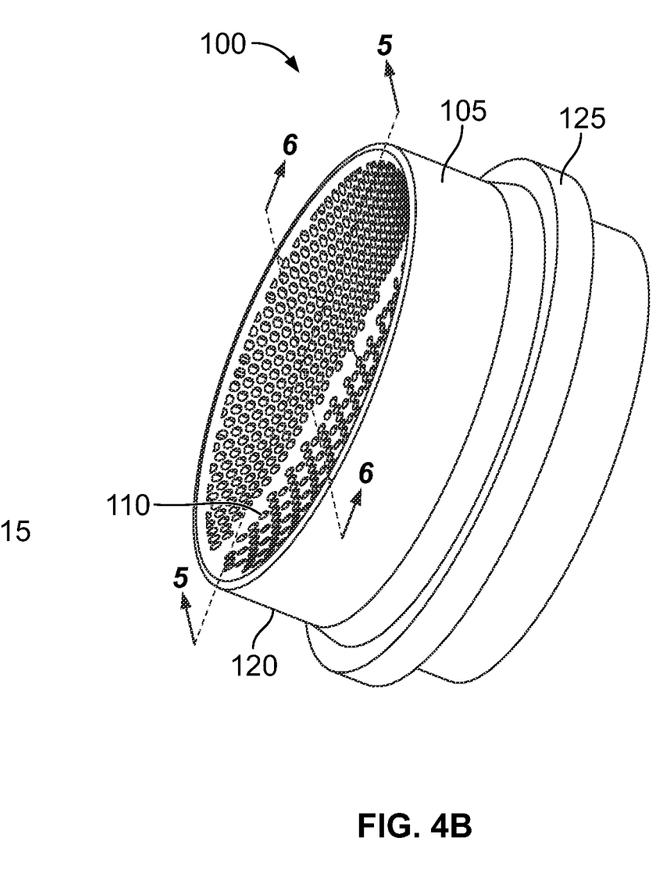

Referring to FIGS. 1-3, an example ball valve 10 is shown that can be used with the attenuator domes shown and described herein. Ball valve 10 generally includes a valve body 15 having an inlet 20 and an outlet 25. A flow control member 30 is positioned within valve body 15 between inlet 20 and outlet 25 and is rotatable between an open position, or fully open position, in which fluid flow is allowed between inlet 20 and outlet 25, and a closed position, in which fluid flow is not allowed between inlet 20 and outlet 25. Flow control member 30 can also be positioned in any position between the open and closed positions to control the volume of fluid flowing between inlet 20 and outlet 25. In the example shown, flow control member 30 has a generally spherical shape with an outside surface 35 that is arcuate and has a radius of curvature. A shaft 40 extends through valve body 15 and is connected to flow control member 30 to rotate flow control member 30 between the open and closed positions. An attenuator dome 100 is positioned within valve body 15 downstream of flow control member 30 and preferably directly adjacent to flow control member 30 to provide noise attenuation to the fluid flow exiting flow control member 30.

Referring to FIGS. 4A-6, an example attenuator dome 100 for use in ball valve 10 is shown, which is configured to be positioned within valve body 15 downstream of flow control member 30. Attenuator dome has a body 105 that, in the example shown, is a unitary, integrally formed, single-piece structure that can be formed using Additive Manufacturing Technology, such as direct metal laser sintering, full melt powder bed fusion, etc. Using an Additive Manufacturing Technology process, the 3-dimensional design of body 105 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed body 105. Using an Additive Manufacturing Technology process to manufacture attenuator dome 100 allows the freedom to produce flow passages and plenums having various shapes, geometries, and features that are not possible using current standard casting or drilling techniques. Alternatively, body 105 can also be manufactured in multiple sections that are then assembled and secured together to create body 105.

Body 105 defines an upstream surface 110, a downstream surface 115 opposite upstream surface 110, and a circumferential surface 120 that is preferably cylindrical, but can be any shape appropriate for a given valve body, and extends between upstream surface 110 and downstream surface 115. In the example shown, an annular flange 125 extends from circumferential surface 120 proximate downstream surface 115 to position and seat attenuator dome 100 within valve body 15. Upstream surface 110 of body 105 is preferably arcuate with a radius of curvature equal to the radius of curvature of outside surface 35 of flow control member 30 so that fluid flow exiting flow control member 30 flows directly into attenuator dome 100 at all positions of flow control member 30.

In the example shown, body 105 includes three attenuation sections, but could include two attenuation sections or more than three attenuation sections, depending on the particular requirements of the given application. First attenuation section 200 includes a single stage 205 with a first plurality of passages 210 that extend through body 105 from upstream surface 110 to downstream surface 115 such that the single stage 205 has a first flow area percentage. As used herein, the flow area percentage of an attenuation section is defined as the percentage of open flow area created by the inlet of the passages in the attenuation section over the total cross sectional area of the attenuation section. As shown, first plurality of passages 210 are linear and extend straight through body 105. However, first plurality of passages 210 could also be arcuate or have other complex shapes (e.g., spiral, made from triply periodic surfaces, etc.) from upstream surface 110 to downstream surface 115 and extend through body 105 in any manner desired. In addition, the downstream wall of single stage 205 is shown being planar, but could also be arcuate (e.g., matching the radius of curvature of upstream surface 110), which would be better if first plurality of passages 210 were arcuate or comprised other complex shapes.

In addition to first attenuation section 200, body 105 can have one or more additional attenuation sections. Each of the additional attenuation sections would have at least a first stage consisting of a plurality of passages that extend from upstream surface 110 to a plenum formed within the body and are in fluid communication with the plenum and each consecutive additional attenuation section would have a greater number of stages than an adjacent additional attenuation section.

For example, in the example shown, body 105 of attenuation dome 100 has two additional attenuation sections, a second attenuation section 300 with two stages and a third attenuation section 400 with three stages. First stage 305 of second attenuation section 300 includes a second plurality of passages 310 that extend from upstream surface 110 of body 105 to a first plenum 315, which is formed inside body 105, such that first stage 305 of second attenuation section 300 has a second flow area percentage that is less than the first flow area percentage of single stage 205 of first attenuation section 200. In addition, as shown, second plurality of passages 310 are linear and extend straight through first stage 305. However, second plurality of passages 310 could also be arcuate or have other complex shapes (e.g., spiral, made from triply periodic surfaces, etc.) from upstream surface 110 to first plenum 315 and extend in any manner desired. In addition, the downstream wall of first stage 305 of second attenuation section 300 is shown being planar, but could also be arcuate (e.g., matching the radius of curvature of upstream surface 110), which would be better if second plurality of passages 310 were arcuate or comprised other complex shapes.

Figure 5:
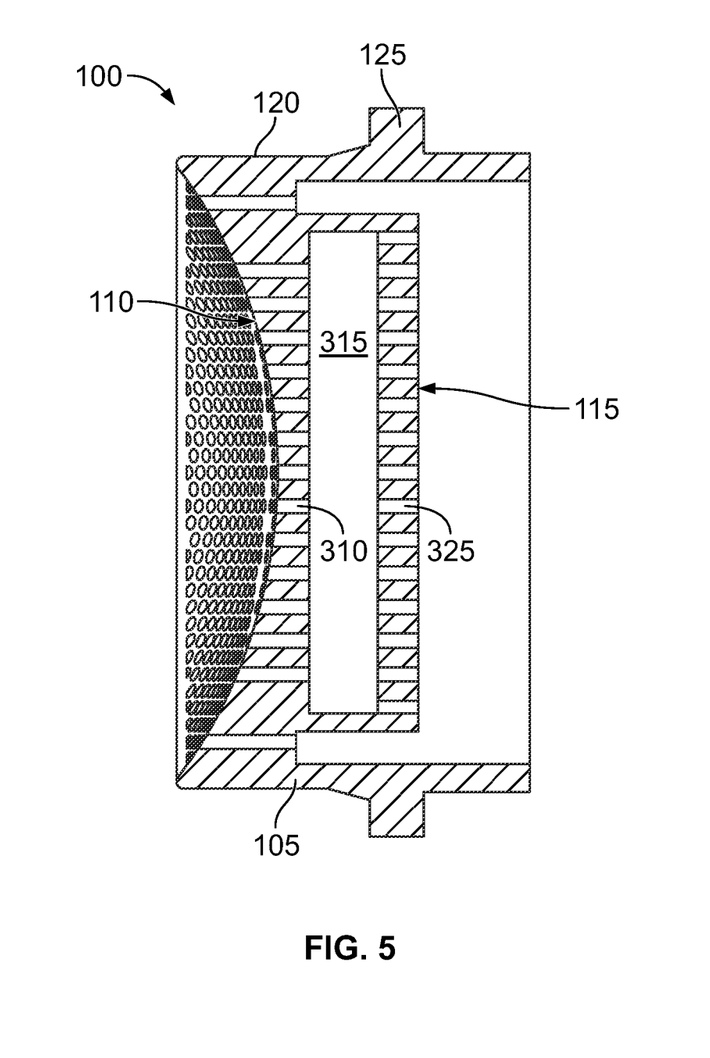
FIG. 5 is a side cross-sectional view of the attenuator dome of FIGS. 4A and 4B taken along line 5-5 in FIG. 4B.
Figure 6:
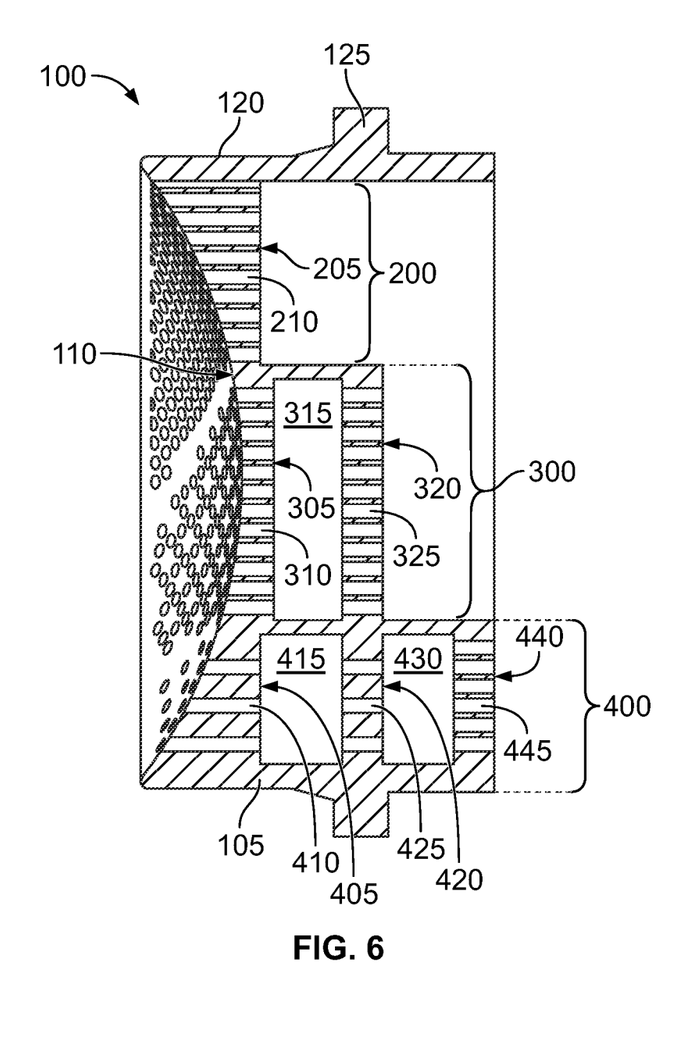
FIG. 6 is a top cross-section view of the attenuator dome of FIGS. 4A and 4B taken along line 6-6 in FIG. 4B.

Second stage 320 of second attenuation section 300 includes a third plurality of passages 325 that extend from first plenum 315 to downstream surface 115 of body 105, such that second stage 320 of second attenuation section 300 has a third flow area percentage that is greater than the second flow area percentage of first stage 305. For example, the third flow area percentage of second stage 320 of second attenuation section 300 could be equal to the first flow area percentage of single stage 205 of first attenuation section 200. As shown, second stage 320 of second attenuation section 300 is planar, however, second stage 320 could also be arcuate, which would be better if third plurality of passages 325 were arcuate or comprised other complex shapes. For example, the upstream and/or downstream surfaces of second stage 320 could have the same or similar radius of curvature as upstream surface 110 of body 105. In addition, as shown, third plurality of passages 325 are linear and extend straight through second stage 320. However, third plurality of passages 325 could be arcuate or have other complex shapes (e.g., spiral, made from triply periodic surfaces, etc.) from first plenum 315 to downstream surface 115 and extend in any manner desired.

First stage 405 of third attenuation section 400 includes a fourth plurality of passages 410 that extend from upstream surface 110 of body 105 to a second plenum 415, which is formed inside body 105, such that first stage 405 of third attenuation section 400 has a fourth flow area percentage that is less than the second flow area percentage of first stage 305 of second attenuation section 300. In addition, as shown, fourth plurality of passages 410 are linear and extend straight through first stage 405. However, fourth plurality of passages 410 could also be arcuate or have other complex shapes (e.g., spiral, made from triply periodic surfaces, etc.) from upstream surface 110 to second plenum 415 and extend in any manner desired. In addition, the downstream wall of first stage 405 of third attenuation section 400 is shown being planar, but could also be arcuate (e.g., matching the radius of curvature of upstream surface 110), which would be better if fourth plurality of passages 410 were arcuate or comprised other complex shapes.

Second stage 420 of third attenuation section 400 includes a fifth plurality of passages 425 that extend from second plenum 415 to a third plenum 430, which is formed inside body 105, such that second stage 420 of third attenuation section 400 has a fifth flow area percentage that is greater than the fourth flow area percentage of first stage 405. For example, the fifth flow area percentage of second stage 420 of third attenuation section 400 could be equal to the second flow area percentage of first stage 305 of second attenuation section 300. As shown, second stage 420 of third attenuation section 400 is planar, however, second stage 420 could also be arcuate, which would be better if fifth plurality of passages 425 were arcuate or comprised other complex shapes. For example, the upstream and/or downstream surfaces of second stage 420 could have the same or similar radius of curvature as upstream surface 110 of body 105. In addition, as shown, fifth plurality of passages 425 are linear and extend straight through second stage 420. However, fifth plurality of passages 425 could be arcuate or have other complex shapes (e.g., spiral, made from triply periodic surfaces, etc.) from second plenum 415 to third plenum 430 and extend in any manner desired.

Third stage 440 of third attenuation section 400 includes a sixth plurality of passages 445 that extend from third plenum 430 to downstream surface 115, such that third stage 440 of third attenuation section 400 has a sixth flow area percentage that is greater than the fifth flow area percentage of second stage 420. For example, the sixth flow area percentage of third stage 440 of third attenuation section 400 could be equal to the third flow area percentage of second stage 320 of second attenuation section 300, which can be equal to the first flow area percentage of single stage 205. As shown, third stage 440 of third attenuation section 400 is planar, however, third stage 440 could also be arcuate, which would be better if sixth plurality of passages 445 were arcuate or comprised other complex shapes. For example, the upstream and/or downstream surfaces of third stage 440 could have the same or similar radius of curvature as upstream surface 110 of body 105. In addition, as shown, sixth plurality of passages 445 are linear and extend straight through third stage 440. However, sixth plurality of passages 445 could be arcuate or have other complex shapes (e.g., spiral, made from triply periodic surfaces, etc.) from third plenum 430 to downstream surface 115 and extend in any manner desired.

The differences in flow area percentages described above between attenuation sections and between stages in the same attenuation section can be accomplished in a variety of ways. For example, the passages in different attenuation sections/stages could have the same size, or cross-sectional area, and the number of passages in each attenuation section/stage could be different. The greater the number of passages/area in an attenuation section/stage, the larger the flow area percentage. Alternatively, the same or similar number of passages could be used in each attenuation section/stage and the cross-sectional area of the passages could be different. For example, in the example above, each of first plurality of passages 210 could have a first cross-sectional area, each of second plurality of passages 310 could have a second cross-sectional area smaller than the first cross-sectional area, each of third plurality of passages 325 could have a third cross-sectional area greater than the second cross-sectional area, each of fourth plurality of passages 410 could have a fourth cross-sectional area smaller than the second cross-sectional area, each of fifth plurality of passages 425 could have a fifth cross-sectional area greater than the fourth cross-sectional area, and each of sixth plurality of passages 445 could have a sixth cross-sectional area greater than the fifth cross-sectional area.

Although the various attenuation sections and stages are shown with a specific number of passages having specific cross-sectional shapes and plenums having specific shapes, any number of passages can be used in each attenuation section/stage and the passages and plenums can have any cross-sectional shape desired, as long as the attenuation sections each provide a different noise attenuation, preferably higher for each consecutive attenuation section (e.g., third attenuation section 400 will have a noise attenuation greater than that of second attenuation section 300, which will have a noise attenuation greater than that of first attenuation section 200).

In the example shown, with three attenuation sections, third attenuation section 400 would be considered the first section that provides a first conditioned fluid flow with the flow control member positioned between the closed position and a first position (the first position being between the closed position and the open position), the second attenuation section 300 would be considered the second section that provides a second conditioned fluid flow, different than the first conditioned fluid flow, with the flow control member positioned between the first position and a second position (the second position being between the first position and the open position), and the first attenuation section 200 would be considered the third section that provides a third conditioned fluid flow, different than the first conditioned fluid flow and the second conditioned fluid flow, with the flow control member positioned between the second position and the open position.

If body 105 were to only include two attenuation sections, for example first attenuation section 200 and second attenuation section 300, second attenuation section 300 would be considered the first section that provides a first conditioned fluid flow with the flow control member positioned between the closed position and a first position (the first position being between the closed position and the open position) and first attenuation section 200 would be considered the second section that provides a second conditioned fluid flow, different than the first conditioned fluid flow, with the flow control member positioned between the first position and a second position (the second position being between the first position and the open position).

While various embodiments have been described above, this disclosure is not intended to be limited thereto. Variations can be made to the disclosed embodiments that are still within the scope of the appended claims.

What is claimed is:

1. An attenuator dome for a ball valve, the attenuator dome comprising:
    a body defining an upstream surface, a downstream surface opposite the upstream surface, and a circumferential surface extending between the upstream surface and the downstream surface, the body comprising:
    a first attenuation section having a single stage with a first plurality of passages extending through the body from the upstream surface to the downstream surface, the single stage of the first attenuation section having a first flow area percentage; and
    a second attenuation section having a first stage with a second plurality of passages extending from the upstream surface to a first plenum formed inside the body and a second stage with a third plurality of passages extending from the first plenum to the downstream surface, the first stage of the second attenuation section having a second flow area percentage that is less than the first flow area percentage and the second stage of the second attenuation section having a third flow area percentage that is greater than the second flow area percentage and equal to the first flow area percentage.

2. The attenuator dome of claim 1, wherein each of the first plurality of passages has a first cross-sectional area, each of the second plurality of passages has a second cross-sectional area smaller than the first cross-sectional area, and each of the third plurality of passages has a third cross-sectional area greater than the second cross-sectional area.

3. The attenuator dome of claim 1, wherein the body is a unitary, integrally formed, single-piece structure.

4. The attenuator dome of claim 1, wherein the first plurality of passages are arcuate from the upstream surface to the downstream surface.

5. The attenuator dome of claim 1, wherein the second stage of the second attenuation section is arcuate.

6. The attenuator dome of claim 1, wherein the second plurality of passages are arcuate from the upstream surface to the first plenum and the third plurality of passages are arcuate from the first plenum to the downstream surface.

7. The attenuator dome of claim 1, wherein the upstream surface is arcuate and has a radius of curvature equal to a radius of curvature of an outside surface of a flow control member of the ball valve.

8. A ball valve including the attenuator dome of claim 1, the ball valve comprising:
    a valve body having an inlet and an outlet;
    a flow control member positioned within the valve body and rotatable between an open position, in which fluid flow is allowed between the inlet and the outlet, and a closed position, in which fluid flow is not allowed between the inlet and the outlet, the flow control member having an outside surface having a radius of curvature; and
    a shaft extending through the valve body an connected to the flow control member to rotate the flow control member between the open position and the closed position; wherein the attenuator dome is positioned within the valve body downstream of the flow control member and the upstream surface is arcuate and has a radius of curvature equal to the radius of curvature of the flow control member.

9. An attenuator dome for a ball valve, the attenuator dome comprising:
- a body defining an upstream surface, a downstream surface opposite the upstream surface, and a circumferential surface extending between the upstream surface and the downstream surface, the body comprising:
- a first attenuation section having a single stage with a first plurality of passages extending through the body from the upstream surface to the downstream surface, the single stage of the first attenuation section having a first flow area percentage;
- a second attenuation section having a first stage with a second plurality of passages extending from the upstream surface to a first plenum formed inside the body and a second stage with a third plurality of passages extending from the first plenum to the downstream surface, the first stage of the second attenuation section having a second flow area percentage that is less than the first flow area percentage and the second stage of the second attenuation section having a third flow area percentage that is greater than the second flow area percentage; and
- a third attenuation section having a first stage with a fourth plurality of passages extending from the upstream surface to a second plenum formed inside the body, a second stage with a fifth plurality of passages extending from the second plenum to a third plenum formed inside the body, and a third stage with a sixth plurality of passages extending from the third plenum to the downstream surface, wherein the first stage of the third attenuation section has a fourth flow area percentage that is less than the second flow area percentage, the second stage of the third attenuation section has a fifth flow area percentage that is greater than the fourth flow area percentage, and the third stage of the third attenuation section has a sixth flow area percentage that is greater than the fifth flow area percentage.

10. The attenuator dome of claim 9, wherein the fifth flow area percentage is equal to the second flow area percentage and the sixth flow area percentage is equal to the first flow area percentage.

11. The attenuator dome of claim 9, wherein each of the fourth plurality of passages has a fourth cross-sectional area smaller than the cross-sectional area of the second plurality of passages, each of the fifth plurality of passages has a fifth cross-sectional area greater than the fourth cross-sectional area, and each of the sixth plurality of passages has a sixth cross-sectional area greater than the fifth cross-sectional area.

12. The attenuator dome of claim 9, wherein the fourth plurality of passages are arcuate from the upstream surface to the second plenum, the fifth plurality of passages are arcuate from the second plenum to the first plenum, and the sixth plurality of passages are arcuate from the first plenum to the downstream surface.

13. The attenuator dome of claim 9, wherein the second stage of the third attenuation section is arcuate, and the third stage of the third attenuation section is arcuate.

14. The attenuator dome of claim 9, wherein the third flow area percentage equal to the first flow area percentage.

15. The attenuator dome of claim 9, wherein each of the first plurality of passages has a first cross-sectional area, each of the second plurality of passages has a second cross-sectional area smaller than the first cross-sectional area, and each of the third plurality of passages has a third cross-sectional area greater than the second cross-sectional area.

16. The attenuator dome of claim 9, wherein the body is a unitary, integrally formed, single-piece structure.

17. The attenuator dome of claim 9, wherein the first plurality of passages are arcuate from the upstream surface to the downstream surface.

18. The attenuator dome of claim 9, wherein the second stage of the second attenuation section is arcuate.

19. The attenuator dome of claim 9, wherein the second plurality of passages are arcuate from the upstream surface to the first plenum and the third plurality of passages are arcuate from the first plenum to the downstream surface.

20. The attenuator dome of claim 9, wherein the upstream surface is arcuate and has a radius of curvature equal to a radius of curvature of an outside surface of a flow control member of the ball valve.

21. A ball valve including the attenuator dome of claim 9, the ball valve comprising:
- a valve body having an inlet and an outlet;
- a flow control member positioned within the valve body and rotatable between an open position, in which fluid flow is allowed between the inlet and the outlet, and a closed position, in which fluid flow is not allowed between the inlet and the outlet, the flow control member having an outside surface having a radius of curvature; and
- a shaft extending through the valve body an connected to the flow control member to rotate the flow control member between the open position and the closed position; wherein
the attenuator dome is positioned within the valve body downstream of the flow control member and the upstream surface is arcuate and has a radius of curvature equal to the radius of curvature of the flow control member.

* * * * *

UNITED STATES PATENT AND TRADEMARK OFFICE
CERTIFICATE OF CORRECTION

| | |
|---|---|
| PATENT NO. | : 11,644,124 B1 |
| APPLICATION NO. | : 17/228226 |
| DATED | : May 9, 2023 |
| INVENTOR(S) | : Daniel J. Eilers et al. |

It is certified that error appears in the above-identified patent and that said Letters Patent is hereby corrected as shown below:

In the Specification

At Column 1, Line 18, "a between" should be -- between --.

At Column 2, Line 60, "arcuate" should be -- arcuate. --.

At Column 3, Line 1, "an" should be -- and --.

At Column 4, Line 10, "in" should be -- an --.

At Column 9, Lines 10-11, "passages/area" should be -- passages/areas --.

In the Claims

At Column 10, Line 64, "an" should be -- and --.

At Column 12, Line 11, "equal" should be -- is equal --.

At Column 12, Line 44, "an" should be -- and --.

Signed and Sealed this
Fourteenth Day of May, 2024

Katherine Kelly Vidal
*Director of the United States Patent and Trademark Office*